(12) United States Patent
Nishiguchi et al.

(10) Patent No.: US 8,667,278 B2
(45) Date of Patent: Mar. 4, 2014

(54) INFORMATION PROCESSING APPARATUS AND DATA TRANSMISSION METHOD OF INFORMATION PROCESSING APPARATUS

(75) Inventors: Naoki Nishiguchi, Kawasaki (JP); Eiji Hasegawa, Kawasaki (JP); Noboru Iwamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1487 days.

(21) Appl. No.: 12/075,417

(22) Filed: Mar. 10, 2008

(65) Prior Publication Data
US 2008/0229106 A1    Sep. 18, 2008

(30) Foreign Application Priority Data
Mar. 15, 2007   (JP) .................. 2007-067086

(51) Int. Cl.
  *H04L 29/06*   (2006.01)
  *H04L 9/32*    (2006.01)
(52) U.S. Cl.
  USPC ............ 713/168; 713/155; 713/169; 713/170
(58) Field of Classification Search
  USPC ................... 713/168, 170, 155, 169
  See application file for complete search history.

(56) References Cited

U.S. PATENT DOCUMENTS

| | | | | |
|---|---|---|---|---|
| 5,905,799 | A * | 5/1999 | Ganesan ....................... | 380/279 |
| 6,802,001 | B1 * | 10/2004 | Dent ............................ | 713/171 |
| 6,970,562 | B2 * | 11/2005 | Sandhu et al. ................ | 380/30 |
| 7,017,041 | B2 * | 3/2006 | Sandhu et al. ................ | 713/156 |
| 7,231,521 | B2 * | 6/2007 | Buddhikot et al. ........... | 713/171 |
| 7,249,105 | B1 * | 7/2007 | Peinado et al. ................ | 705/56 |
| 7,757,952 | B2 * | 7/2010 | Tuschel et al. ................ | 235/440 |
| 2003/0140009 | A1 | 7/2003 | Namba et al. | |
| 2004/0139352 | A1 * | 7/2004 | Shewchuk et al. ............ | 713/201 |
| 2006/0005033 | A1 * | 1/2006 | Wood ............................ | 713/182 |

FOREIGN PATENT DOCUMENTS

| | | |
|---|---|---|
| JP | 10-260939 | 9/1998 |
| JP | 2002-312317 | 10/2002 |
| JP | A 2003-22377 | 1/2003 |
| JP | A 2005-242831 | 9/2005 |

OTHER PUBLICATIONS

Japanese Office Action issued in corresponding Japanese App. No. 2007-067086 dated Jan. 24, 2012 (with translation).

* cited by examiner

*Primary Examiner* — Mohammad W Reza
(74) *Attorney, Agent, or Firm* — Greer Burns & Crain Ltd.

(57) ABSTRACT

An apparatus stores first divided trust information which is one portion resulting from division of trust information generated by a transmission target apparatus that is a transmission target for data, receives a transmission request for the data from the target apparatus and receives second divided trust information which is the other portion resulting from division of the trust information of the target apparatus and verification information generated using information indicating a state of the target apparatus that made the request, recovers the trust information using the first divided trust information stored and the received second divided trust information, verifies trustworthiness of the target apparatus using the recovered trust information and the received verification information, transmits the data indicated by the request to the target apparatus when the verification of trustworthiness is successful.

15 Claims, 10 Drawing Sheets

FIG. 2

| USED INFORMATION | | | INFORMATION GENERATED OR STORED IN TRANSMISSION TARGET PC-B | INFORMATION GENERATED OR STORED IN TRANSMISSION SOURCE PC-A |
|---|---|---|---|---|
| KEY | | | | |
| | OWN KEY (PC-B) | PUBLIC KEY (KPB) PRIVATE KEY (KSB) | OWN PRIVATE KEY (KSB) | OWN PRIVATE KEY (KSA) |
| | KEYS OF OTHER PCS (PC-A) | PUBLIC KEY (KPA) PRIVATE KEY (KSA) | OTHER PC PUBLIC KEY (KPA) | OTHER PC PUBLIC KEY (KPB) |
| | ⋮ | ⋮ | ⋮ | ⋮ |
| | (PC-N) | PUBLIC KEY (KPn) PRIVATE KEY (KSn) | OTHER PC PUBLIC KEY (KPn) | OTHER PC PUBLIC KEY (KPn) |
| COMMON KEY | | | KCA | — | KCA |
| KEY INFORMATION | | | KIB | KIB (FOR TRANSMISSION) | KIB (RECEIVED) |
| TRUST INFORMATION TIB  TIB { DIBA / DIBB } | | | FIRST DIVIDED TRUST INFORMATION (DIBA) | — | FIRST DIVIDED TRUST INFORMATION (DIBA) |
| | | | SECOND DIVIDED TRUST INFORMATION (DIBB) | SECOND DIVIDED TRUST INFORMATION (DIBB) | — |
| VERIFICATION INFORMATION | | | VIB | VIB (FOR TRANSMISSION) | VIB (RECEIVED) |
| ORIGINAL VERSION OF DATA FOR TRANSMISSION | | | DT | — | DT |
| DATA DT AFTER ENCRYPTION USING PUBLIC KEY KPB | | | KPB(DT) | KPB(DT) | KPB(DT) |

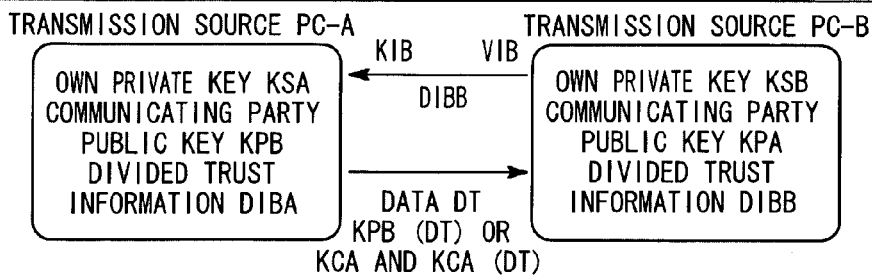

INFORMATION PROCESSING APPARATUS AND DATA TRANSMISSION METHOD OF INFORMATION PROCESSING APPARATUS

CROSS-REFERENCE TO RELATED APPLICATIONS

This application is based upon and claims the benefit of priority from the prior Japanese Patent Application No. 2007-67086 filed on Mar. 15, 2007, the entire contents of which are incorporated herein by reference.

TECHNICAL FIELD

The present invention relates to an information processing apparatus and a data transmission method thereof. In particular, the present invention relates to situations where, when data is to be transmitted between information processing apparatuses, which only allow transmission of data between apparatuses which trust each other, and a data transmission method thereof.

BACKGROUND OF INVENTION

When transmitting data between two information processing apparatuses, various methods exist for concealing the data by encryption and subsequently transmitting the encrypted data.

For instance, data can be concealed using Public-key cryptography.

In this case, a pair of keys, composed of a private key and a public key, is generated for each of the information processing apparatuses (hereinafter referred to as "PCs").

Information encrypted using the public key can only be decrypted using the private key of the pair. Conversely, information encrypted using the private key can only be decrypted using the public key of the pair.

When data D0 is transmitted from a given information processing apparatus (PC-A) to another information processing apparatus (PC-B), the data is first encrypted in PC-A using a public key KPB of the PC-B.

The encrypted data (KPB (D0)) can only be decrypted using a private key KSB of the PC-B.

The encrypted data (KPB (D0)) is then transmitted from the PC-A to the PC-B.

However, in Public-key cryptography which use a public key and a private key in this way, a large amount of time is required to encrypt and decrypt the data.

In the following method, a common key KCA is first generated by the PC-A, which is the transmission source of the data.

The PC-A further encrypts the common key KCA using the private key KSA held only by the PC-A, and generates a signature key KSA (KCA).

Further, the PC-A encrypts the signature key KSA (KCA) using the public key KPB of the PC-B to generate key information KEY(=KPB (KSA(KCA))).

Information made up of the encrypted data KCA (D0) and the key information KEY generated in the manner described is transmitted from the PC-A to the PC-B.

On receipt of these two pieces of information, the transmission target PC-B performs the next processing.

First, the PC-B decrypts the key information KEY using the private key KSB held only by the PC-B to recover the signature key KSA (KCA).

A successful decryption proves that the data has been legitimately transmitted from the PC-A which is a trusted party.

Thereafter, the PC-B uses the common key KCA acquired by the above described decryption processing to decrypt received encrypted data KCA (D0).

An access control method using an administrating computer (hereinafter "server") to control access with a high degree of reliability by strengthening protection against illegitimate data acquisition and illegitimate access has been proposed (see Japanese Patent Laid-Open No. 2005-242831).

This control method also makes use of a Public-key cryptography, but with this method the public keys (KPA and KPB) of both PCs and trust information TIB (in the case of the PC-B) of the side requesting access is stored in advance in the server.

The trust information TIB is information generated using a special program and settings data which exist in the PC-B, and allows an operating state of the PC-B, which is the transmission target, to be specified.

Further, the private key KSA paired with the public key KPA is stored in advance in the PC-A, and the private key KSB paired with the public key KPB is stored in advance in the PC-B.

When the transmission target PC-B asks the server for an access request to the transmission source PC-A, the PC-B collects information indicating a current operating state of the PC-B, and generates information (verification information VIB) corresponding to the trust information (TIB).

The transmission target PC-B then transmits the access request and the verification information VIB to the server.

On receipt of the access request, the server compares the stored trust information TIB of the PC-B with the received verification information VIB, and checks whether the PC-B which has made the access request is a trustworthy apparatus.

When the two pieces of information (TIB and VIB) match and the apparatus is judged to be trustworthy, the server generates a new pair of keys composed of a private key KB1 and a public key KB2.

The server then transmits an access permission instruction indicating that the PC-B is allowed to access the PC-A, and the newly generated public key KB2 to the transmission source PC-A.

Further, the server transmits a message indicating that access has been permitted together with the newly generated private key KB1 to the transmission target PC-B.

When, for instance, the PC-B has requested transmission of data D1 from the PC-A, the data D1 is transmitted to the PC-B by the transmission source PC-A after encryption using the public key KB2.

However, conventional methods for transmitting the key information and the encrypted data presuppose that each apparatus holds an apparatus-specific private key.

Therefore, if a third party who has illegitimately acquired the private key KSB, for instance, is trusted as being the legitimate user of PC-B, data will be transmitted from the transmission source PC-A to the third party.

Moreover, since the data is transmitted without confirming the reliability of the transmission target PC-B, data may be transmitted from the PC-A to the PC-B when the PC-B is infected by a computer virus.

Hence, with conventional methods, there is a risk of the data being transmitted to an untrustworthy third party and then being divulged or otherwise misused.

The access control method of Japanese Patent Laid-Open No. 2005-242831 allows an improvement in security through verification of the state of the PC before permitting access, but requires that an administrating computer (server) be provided.

Hence, in environments where the server cannot be used, this type of highly secure data transmission cannot be used.

Also, when specific individual users are to transmit data to each other, there are times when it is undesirable to use a system which employs a server.

Hence, an arrangement is desired which allows data transmission between parties with a high degree of security after a mutual confirmation of trustworthiness, even in environments where a server is not used.

SUMMARY

According to an aspect of an embodiment, an apparatus includes a storage unit adapted to acquire in advance and store first divided trust information which is one portion resulting from division, by a predetermined dividing method, of trust information generated by a transmission target information processing apparatus that is a transmission target for designated data. A communication unit is adapted to receive a transmission request for the data from the transmission target information processing apparatus and receive, at receipt of the transmission request, second divided trust information which is the other portion resulting from division of the trust information of the transmission target information processing apparatus and verification information generated using information indicating a specific state of the transmission target information processing apparatus at issue for the transmission request. A trust information recovering unit is adapted to recover the trust information using the first divided trust information stored in the storage unit and the received second divided trust information. An apparatus verifying unit is adapted to verify trustworthiness of the transmission target information processing apparatus using the recovered trust information and the received verification information; and a transmission unit is adapted to transmit the data indicated by the transmission request to the transmission target information processing apparatus when the verification of trustworthiness is successful.

According to another embodiment of the present invention, the division of the trust information of the transmission target information processing apparatus and the advance acquisition and storage of one portion of the trust information make it possible to confirm, in a simple manner, the trustworthiness of the information processing apparatus to which data is to be transmitted without using a third party trustworthy administrating apparatus.

According to an embodiment of the present invention, the designated data is only transmitted to the transmission target information processing apparatus when the confirmation of trustworthiness has been successful.

Hence, it is possible to prevent the data from being inappropriately divulged to an external party as a result of illegitimate access by an untrustworthy apparatus, and security can be improved.

The above described apparatus holds the data to be transmitted and is the transmission source information processing apparatus which receives the transmission request.

According to another aspect of an embodiment, the trust information may be divided into the first divided trust information and the second divided trust information using a Secret Sharing Scheme.

According to another aspect of an embodiment, if the recovered trust information and the received verification information are data of a same format, the apparatus verifying unit may judge that the verification of trustworthiness of the transmission target information processing apparatus has been successful when the trust information and the verification information match.

According to an aspect of an embodiment, the apparatus may further include a trust information dividing unit adapted to divide the trust information into two portions of divided trust information using a predetermined division method. The apparatus verifying unit uses, when the verification of trustworthiness has failed, the received verification information, and updates the trust information. Then the trust information dividing unit divides the updated trust information into two portions, stores one of the two portions as the first divided trust information of the storage unit, and transmits the other of the two portions as the second divided trust information to the transmission target information processing apparatus.

According to an aspect of an embodiment, the apparatus may further include an encryption unit adapted to store in advance in the storage unit a public key of the transmission target information processing apparatus, and encrypt the data indicated by the transmission request using the public key, wherein the communication unit may transmit the data encrypted by the encryption unit to the transmission target information processing apparatus.

The encryption increases security when transmitting the designated data and thereby prevents the data from being divulged inappropriately.

According to an aspect of an embodiment, the apparatus may further include a key generating unit adapted to generate a common key; and an encryption unit adapted to encrypt the data indicated by the transmission request using the common key. A public key of the transmission target information processing apparatus may be stored in advance in the storage unit, and the communication unit may transmit the data encrypted by the encryption unit and the common key, encrypted using the public key of the transmission target information processing apparatus, to the transmission target information processing apparatus.

According to an aspect of an embodiment, an apparatus includes a key generating unit adapted to generate its own private key and its own public key; a communication unit adapted to receive, from the transmission target information processing apparatus that is a transmission target for designated data, trust information generated using information indicating a specific state of the transmission target information processing apparatus. A trust information dividing unit is adapted to divide the trust information into two portions of divided trust information using a predetermined division method; and a storage unit is adapted to store first divided trust information resulting from the division and the own private key. The communication unit may transmit its own generated public key and second divided trust information resulting from the division to the transmission target information processing apparatus.

The above described apparatus is also the transmission source information processing apparatus and includes a function for performing exchange processing before the data transmission.

According to an aspect of an embodiment, an apparatus may further include a storage unit adapted to store in advance its own private key, a public key of a transmission source information processing apparatus from which data is transmitted, and a portion of divided trust information resulting from division of trust information generated using information indicating its own specific state. An apparatus state collecting unit is adapted to collect its own current state information; a trust information generation unit is adapted to generate its own verification information using the collected current state information. A communication unit is adapted to, when making a transmission request for data held by the transmission source information processing apparatus, transmit the generated verification information and the stored divided trust information to the transmission source information processing apparatus. A decryption unit is adapted to, on receipt of transmission request data encrypted using a public key of the communication unit from the transmission source information processing apparatus, decrypt the received data using the stored private key.

The above described apparatus corresponds to the transmission target information processing apparatus.

Note also that state information collected by the apparatus state collecting unit may be in text format or in binary format.

According to an aspect of an embodiment, the divided trust information stored in advance in the storage unit may be stored in an encrypted format using a public key of the transmission source information processing apparatus.

According to an embodiment of the present invention, the divided trust data stored in the storage unit may be encrypted using the public key of the transmission source information processing apparatus.

With this arrangement only the transmission source information processing apparatus, which is the sole apparatus holding the private key, is able perform the decryption, and security can be improved.

According to an aspect of an embodiment, when making the transmission request, the divided trust information to be transmitted may be encrypted using the public key of the transmission source information processing apparatus.

According to an embodiment of the present invention, the transmitted divided trust information has been encrypted using the public key of the transmission source information processing apparatus.

With this arrangement only the transmission source information processing apparatus, which is the sole apparatus holding the private key, is able to perform the decryption, and security can be improved.

According to an aspect of an embodiment, when making the transmission request, the communication unit transmits key information resulting from encryption, using the public key of a newly created private and public key pair of the transmission source information processing apparatus, of information resulting from encryption of the public key using its own private key.

According to an aspect of an embodiment, the apparatus may further include a key generating unit adapted to generate its own private key and its own public key. The trust information generating unit generates its own trust information using the state information collected by the apparatus state collecting unit, and the communication unit transmits the public key and the generated trust information to the transmission source information processing apparatus.

According to an aspect of an embodiment, a method including steps of prior to a transmission source information processing apparatus transmitting data to a transmission target information processing apparatus, the transmission target information processing apparatus generating trust information using current state information collected by an apparatus state collecting unit of the transmission target apparatus, and transmitting the trust information to the transmission source information processing apparatus. Subsequently, the transmission source information processing apparatus generates first trust information and second trust information by dividing the received trust information into portions, the first divided trust information being stored in a storage unit of the transmission source information processing apparatus and the second divided trust information being transmitted to the transmission target information processing apparatus and stored in a storage unit of the transmission target information processing apparatus.

According to another aspect of an embodiment, when the transmission target information processing apparatus requests that the transmission source information processing apparatus transmit data held by the transmission source information processing apparatus, the transmission target information processing apparatus may generate verification information using current state information collected by the apparatus state collecting unit. The generated verification information and the second divided trust information stored in the storage unit of the transmission target information processing apparatus is transmitted to the transmission source information processing apparatus, and subsequently the transmission source information processing apparatus may recover the trust information using the first divided trust information stored in its own storage unit and the received verification information. Trustworthiness of the transmission target information processing apparatus is verified using the recovered trust information and the received verification information, and, if verification of trustworthiness is successful, the requested data is transmitted to the transmission target information processing apparatus.

According to an aspect of an embodiment, when the verification of trustworthiness fails, the transmission source information processing apparatus may generate new trust information from the received verification information, divide the new trust information to generate two portions of divided trust information, store one portion of divided trust information as the first divided trust information in its own storage unit, and transmit an other of the two portions of divided trust information to the transmission target information processing apparatus. The transmission target information processing apparatus may store the received other portion of divided trust information as the second divided trust information.

According to an aspect of an embodiment, a method includes steps of, after generating trust information using information indicating a specific state of a transmission source information processing apparatus, dividing the trust information into two portions using a predetermined division method, storing one of the two portions as first divided trust information in the transmission source information processing apparatus and storing an other of the two portions as second divided trust information in the transmission target information processing apparatus, the transmission source information processing apparatus, when transmitting data to the transmission target information processing apparatus, generating a common key, encrypting the data using the common key, generating verification information using current state information collected by an apparatus state collecting unit of the transmission source information processing apparatus, and transmitting the common key, the stored first divided trust information, the generated verification information and the encrypted data to the transmission target information processing apparatus. Subsequently, the transmission target information processing apparatus recovers the trust information of the transmission source information processing apparatus using the received first divided trust information and the stored second divided trust information, verifying trustworthiness of the transmission source information processing apparatus using the recovered trust information and the received verification information, and, if the verification of trustworthiness is successful, decrypting the received encrypted data using the received common key.

According to an embodiment of the present invention, when data is to be transmitted between the two information processing apparatuses, the trust information of the transmission target information processing apparatus is divided, and one portion is stored in the transmission source information processing apparatus.

With this arrangement, before data transmission by the transmission source information processing apparatus, it is possible to confirm in a simple manner the trustworthiness of the transmission target information processing apparatus, and thereby effectively prevent inappropriate divulgence of data caused by illegitimate access.

BRIEF DESCRIPTION OF THE DRAWINGS

FIG. 2 shows a data structure of information used by the information processing apparatuses of an embodiment of the present invention;

DETAILED DESCRIPTION OF THE EMBODIMENTS

Figure 1:
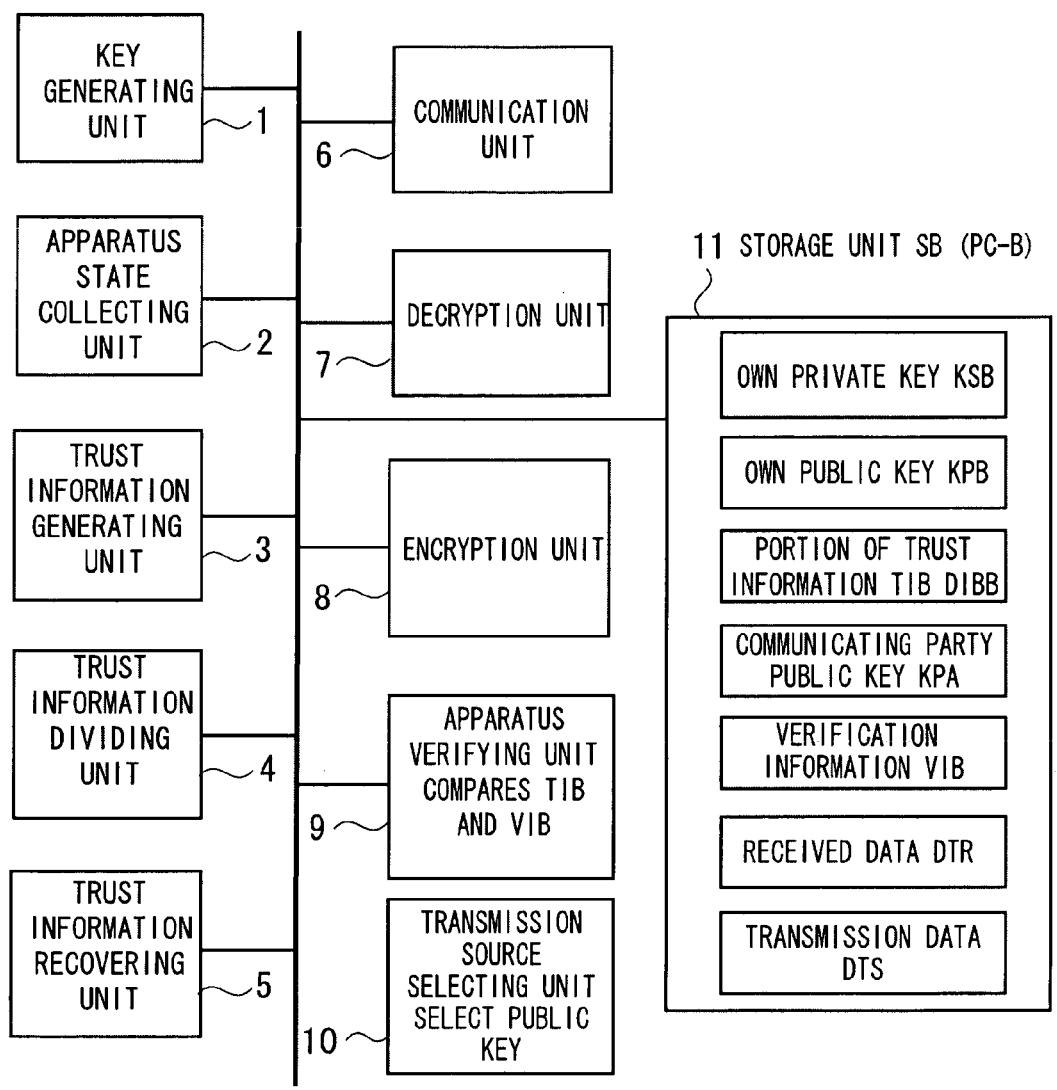
FIG. 1 is a block diagram showing an information processing apparatus of an embodiment of the present invention.

The following describes the present invention based on the embodiment shown in the drawings.
Construction of Information Processing Apparatus FIG. 1 is block diagram showing an example construction of an information processing apparatus (PC) of the invention.

The information processing apparatus PC of the invention is a computer such as a personal computer or workstation and includes a function for data communication with other PCs via a network.

The information processing apparatus PC also includes a function for connecting to a USB memory or external storage apparatus via a wide-use interface (USB, IEEE1394, SCSI) and for data recording and playback.

Data transmission and reception are necessary whichever cable is used, but in the present invention, the data to be transmitted is not simply transmitted in an original state. Rather, the data is encrypted using a predetermined method and only transmitted after the communicating parties confirm that the other communicating party is trustworthy using the method described below.

The information processing apparatus of the present invention can include a wide variety of information processing functions but the embodiment below describes functions from the point of view of data transmission, data protection, and mutual trust confirmation.

As shown in FIG. 1, the information processing apparatus of the present embodiment mainly includes a key generating unit 1, an apparatus state collecting unit 2, a trust information generating unit 3, a trust information dividing unit 4, a trust information recovering unit 5, a communication unit 6, a decryption unit 7, an encryption unit 8, an apparatus verifying unit 9, a transmission source selecting unit 10, and a storage unit 11.

The key generating unit 1 is a portion for generating special data (hereinafter "key") for use in decryption and encryption of information.

The private key generated by the information processing apparatus PC-B is denoted KSB, and the public key generated by the information processing apparatus PC-B is denoted KPB.

In a Symmetric-key cryptography, a single common key is generated for use in the generating PC and in another PC.

The key generation by the key generating unit 1 is performed using a predetermined generating program at initial setting of the information processing apparatus PC, on making data transmission requests, on data decryption, and at other times.

The decryption unit 7 and the encryption unit 8 are, respectively, portions for decrypting and encrypting desired information using keys of the type described above.

The data that is encrypted and decrypted includes data to be transmitted (DTS) and the key itself.

When, for instance, the transmission data DTS is encrypted using the public key KPB of the PC-B, the encrypted data is denoted KPB (DTS).

Further, when a common key KCA is encrypted using the public key KPA of the PC-A, the encrypted key is denoted KPA (KCA).

Conversely, when the encrypted data KPB (DTS) is decrypted using the private key KSB of the PC-B, the original data DTS is acquired.

The communication unit 6 is a portion for communicating data with other information processing apparatus PCs, a USB memory, or the like, and transmits and receives data based on a predetermined communications protocol.

The storage unit 11 is a non-volatile writable memory storing various information, and may be a hard disk, a flash memory, a semiconductor device such as a RAM or a ROM, or a storage medium such as a CD or a DVD.

Besides the transmission data and key, the storage unit 11 stores other information necessary to realize the information processing apparatus of the present embodiment.

FIG. 1 shows a portion of information stored in the PC-B as an example of the above described information.

The apparatus state collecting unit 2 is a portion for checking the state of the information processing apparatus PC and collecting predetermined state information.

The state information is information specified by hardware of the PC or software installed in the PC.

For instance types of installed software, names of the software, version numbers of the software, names and numbers of currently running software, version numbers of installed virus definition pattern files, names and version numbers of installed hardware devices, device start-up information, information concerning the effectiveness or otherwise of anti-virus measures, biometric condition information, information relating to OS or software updates, and the like may all be used as state information.

The trust information generating unit 3 is a portion for generating the trust information TIB and the verification information VIB using the state information collected by the apparatus state collecting unit 2.

The trust information TIB is information generated from the state information when initially setting the PC, when changing or adding hardware or software, and at other times, and is used to indicate a state in which it is possible to identify a given PC.

The verification information VIB is generated while the PC is running from state information of the PC collected whenever particular events occur.

In the simplest case, the trust information TIB and the verification information VIB are generated as a same piece of information.

When the trust information TIB and the verification information VIB are the same, it is possible to use a plurality of collected state information (in text format or binary format) in an original state. Alternatively, a hash value may be calculated for the plurality of information, and used as the trust information and the verification information.

To protect against illegitimate use and falsification, the above-described date and hash value may be encrypted using a predetermined key (the public key of the communicating PC, for instance) and the result used as the trust information and the verification information.

The trust information TIB is generated in advance, when initially setting the PC-B for instance, and stored in the storage unit 11 of the PC-B.

Note that the information used for the trust information TIB need not be the same as the information used for the verification information.

For instance, if ten pieces of state information (J1 to J10) are collected, and four pieces of the state information (for instance J1, J2, J7 and J9) are used as for verification, the trust information TIB may be generated as a list of the four items (J1, J2, J7, J9) and the values to be taken by each item.

In this case, of the ten pieces collected as the verification information VIB, only the four pieces of state information included in the trust information TIB are verified by the apparatus verifying unit 9.

In the present invention, the trust information TIB is not stored unaltered in the PC. The present invention is characterized by the trust information TIB being divided into a plurality of divided information, each portion of which is stored in a separate PC.

Dividing the trust information TIB into a plurality of portions and storing each piece in a separate PC allows the mutual confirmation of trustworthiness between the PCs transmitting data to be performed with a higher degree of certainty, and without using a third party administrating apparatus (server). It is therefore possible to prevent data communication with PCs whose trustworthiness cannot be confirmed and thereby improve security of data transmission.

The trust information dividing unit 4 is a portion for dividing a single piece of trust information TIB into a plurality of portions.

Data transmission generally occurs between two PCs, and so the single piece of trust information is divided into two portions.

An existing data division method may be used for the division. Such methods include simply splitting the data into two halves, splitting alternate bytes, and methods which make use of a Secret Sharing Scheme.

The single piece of trust information TIB is recovered from the divided trust information using predetermined processing.

When the trust information TIB is divided into two, the resulting portions are stored separately in the transmission source PC and the transmission target PC.

The embodiment described below mainly describes data transmission between the PC-A and the PC-B. In this case, the trust information TIB is divided into two portions of divided information, DIBA and DIBB. The divided information DIBA is stored in the PC-A and the divided information DIBB is stored in the PC-B.

The trust information recovering unit 5 is a portion for recovering the original trust information TIB by joining the portions of information (such as DIBA and DIBB) resulting from the division.

When the trust information TIB has been divided into two portions, the resulting divided information (DIBA and DIBB) are stored separately in PC-A and PC-B. However, in the verification processing performed directly before actual data transmission between the PC-A and the PC-B, the divided information is collected by having one of the PCs transmit the divided information stored by said PC to the other PC. The PC receiving the divided information then recovers the trust information TIB.

The apparatus verifying unit 9 is a portion for performing processing (called trust confirmation processing or verification processing) to verify the trustworthiness of a PC that is attempting to transmit data, using the trust information TIB and the verification information VIB.

When the trust information TIB and the verification information VIB are data of the same format, the apparatus verifying unit checks for a match between the two.

The trust information TIB used in the confirmation is the information recovered when the trust information recovering unit 5 joins the divided information DIBA stored in the storage unit 11 and the divided information DIBB received from the communicating PC.

On the other hand, the verification information VIB used in the confirmation is the verification information of the communicating PC received from the PC.

The transmission source selecting unit 10 is a portion for selecting a PC holding data, and for selecting the divided information which is to be transmitted and the public key for encryption.

It may be supposed, for instance, that there are three personal computers (PC-A, PC-B and PC-C), each of which has confirmed that the others are trustworthy.

The transmission source selecting unit 10 is an input device such as a keyboard, or a pointing device such as a mouse, or a pen.

When the three PCs exist as described and the PC-B receives input selecting the PC-C as the transmission source, the divided information DIBB, which is stored in the PC-B, of the trust information for the relationship between the PC-B and the PC-C, is transmitted from PC-B to the PC-C before data transmission.

The information used to confirm the trustworthiness among the three PCs includes a total of six pieces of information of the following three types.

Trust information TIA (A-C) for confirming the trustworthiness of the PC-A and trust information TIC (A-C) for confirming the trustworthiness of the PC-C is used in the relationship between the PC-A and the PC-C in a similar way to the trust information described above.

Similarly, trust information TIB (B-C) for confirming the trustworthiness of the PC-B and trust information TIC (B-C) for confirming the trustworthiness of the PC-C is used in the relationship between the PC-B and the PC-C.

Here, two portions of trust information exist for confirming the trustworthiness of, for instance, the PC-B, and in order to improve security, it is preferable that the trust information TIB (A-B) and the trust information TIB (B-C) differ.

The two pieces of trust information are each divided into two and the resulting divided information is stored on separate PCs.

The TIB (A-B) is divided to form DIBA (A-B) and DIBB (A-B). The DIBA (A-B) is stored in the PC-A, and the DIBB is stored in the PC-B.

In the relationship between the PC-B and the PC-C, TIB (B-C) is divided to form DIBB (B-C) and DIBC (B-C). The DIBB (B-C) is stored in the PC-B, and the DIBC (B-C) is stored in the PC-C.

When the transmission source PC is selected by the transmission source selecting unit 10, the public key to be used in the encryption is also selected.

The information processing apparatus of the present embodiment is made up of the main functional blocks (1 to 10) described above. However, these functional blocks are realized by a microcomputer which includes a CPU, ROM, RAM, an I/O controller, a timer, and the like.

Further, the functions of the functional blocks (1 to 10) are realized by the CPU causing various hardware to operate based on a control program stored in the ROM, the RAM or the like.

FIG. 2 shows an embodiment of the main information used in the present invention.

In FIG. 2 the key KEY is a key used for encrypting or decrypting information.

For instance, when the pair composed of the public key KPB and the private key KSB are created in PCB, the private key KSB is stored by the PC-B as its own key and the public key KPB is stored by the other PC, which may be the PC-A.

The common key KCA is information for encrypting and decrypting the transmission data and is generally generated by the transmission source PC.

The key information KIB is a key, held by a given PC, which has been encrypted using the public key of another PC.

For instance, in the case that the key information KIB is created by the transmission target PC, the key information KIB is information resulting from encryption using the public key of the transmission source PC.

Since, the key information KIB results from encryption using the public key of the transmission source PC, the key information KIB can only be decrypted using the private key of the transmission source PC.

As described below, for instance, when the result (KSB (KPB1)) of encrypting the public key KPB1 of the PC-B using the private key KSB is encrypted using a public key KPA of the differing PC-A, the result (KPA (KSB (KPB1))) is used as the key information KIB (see FIG. 7).

In FIG. 2, the trust information TIB is the trust information of the transmission source PC-B, and is divided into two portions.

Specifically, the trust information TIB is divided to form first divided trust information DIBA and second divided trust information DIBB. The divided trust information DIBA is stored in the PC-A, and the divided trust information DIBB is stored in the PC-B.

The verification information VIB is created in the PC to be verified and transmitted to a communicating PC side in order to have the trustworthiness of the PC confirmed on the communicating PC side.

The original data DT, which is to be transmitted and received, corresponds to the transmission data DTS of FIG. 1 and is stored in the transmission source PC (the PC-A for instance).

The result of encrypting the original data using the public key KPB is denoted KPB (DT). The information KPB (DT) is generated by the transmission source PC-A, which holds the original data DT, and is transmitted to the transmission target PC-B.

Further FIG. 2 shows an embodiment of information to be stored in the transmission source PC-A and the transmission target PC-B and information to be transmitted and received by the two PCs.

Here, the information to be stored refers to information stored before actual data transmission, and is stored in each PC after later-described exchange processing has been performed.

FIG. 2 shows the transmission source PC-A storing its own (PC-A) private key KSA, the communicating party (PC-B) public key KPB and the divided trust information DIBA.

The transmission target PC-B is shown storing its own (PC-B) private key KSB, a communicating party (PC-A) public key KPA and the divided trust information DIBB.

When a data transmission request REQ is transmitted from the transmission target PC-B to the transmission source PC-A, the key information KIB, the verification information VIB, and the divided trust information DIBB are included in the data transmission request REQ, and transmitted from the transmission target PC-B to the transmission source PC-A.

On receipt of the data transmission request REQ, the transmission source PC-A performs predetermined processing to confirm trustworthiness, and subsequently transmits the requested data DT to the transmission target PC-B.

For instance, when encrypted using the public key KPB of the PC-B, the requested data is transmitted as KPB (DT).

When the requested data is encrypted using the common key KCA, the result of encrypting the common key KCA using the public key KPB of the PC-B may be transmitted to the PC-B rather than the common key KCA in an unaltered form.

In this example the key information KIB is not used.

Exchange Processing for Trust Information or the Like

The following describes exchange processing which is performed before data transmission.

The exchange processing is executed between the two information processing apparatuses which are to transmit data, and is always executed in advance of the data transmission.

If, for instance, the exchange processing is performed between the two information processing apparatuses (PC-A and PC-B), both PCs store therein (key and divided trust information) of the type shown in FIG. 2.

The exchange processing can also be performed via a server.

Figure 3:
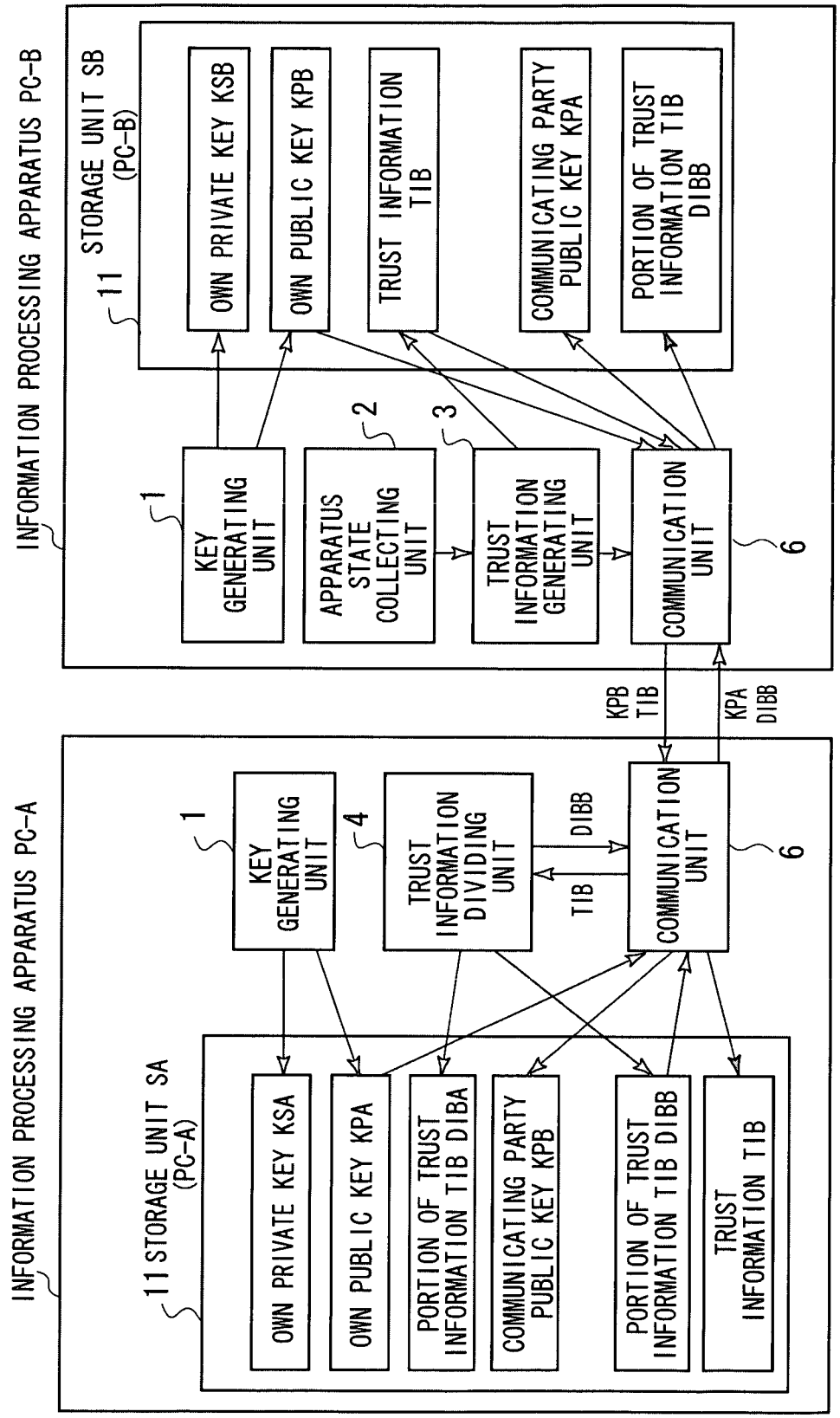
FIG. 3 is a conceptual view of processing to exchange trust information and the like of an embodiment of the present invention.

FIG. 3 shows an example of the exchange processing of the present embodiment.

The following describes exchange processing for transmitting the trust information TIB of the information processing apparatus PC-B, which is the transmission target, to the information processing apparatus PC-A, which is the transmission source.

The blocks of FIG. 3 are the configuration blocks in FIG. 1. However, FIG. 3 shows only the blocks used for the description.

First, the information processing apparatus PC-B performs the key generation processing using the key generating unit 1, the processing to collect state information of the PC-B using the apparatus state collecting unit 2, the processing to generate trust information based on the collected information using the trust information generating unit 3, and the processing to transmit the generated trust information and the like to the PC-A using the communication unit 6 in the stated order.

At this point, the PC-B transmits the trust information TIB of the PC-B and the public key KPB of the PC-B to the PC-A.

Next the information processing apparatus PC-A performs the processing by the communication unit 6 to receive the information, the processing by the trust information dividing unit 4 to divide the received trust information TIB, and the processing by the communication unit 6 to transmit the divided trust information DIBB and the like in the stated order.

At this point, the PC-A transmits the divided trust information DIBB and the public key KPA to the PC-B.

Note that the information processing apparatus PC-A also generates its own private key KSA and its own public key KPA using the key generating unit 1.

When the exchange processing has already been performed, the exchange of keys is not required.

Figure 4:
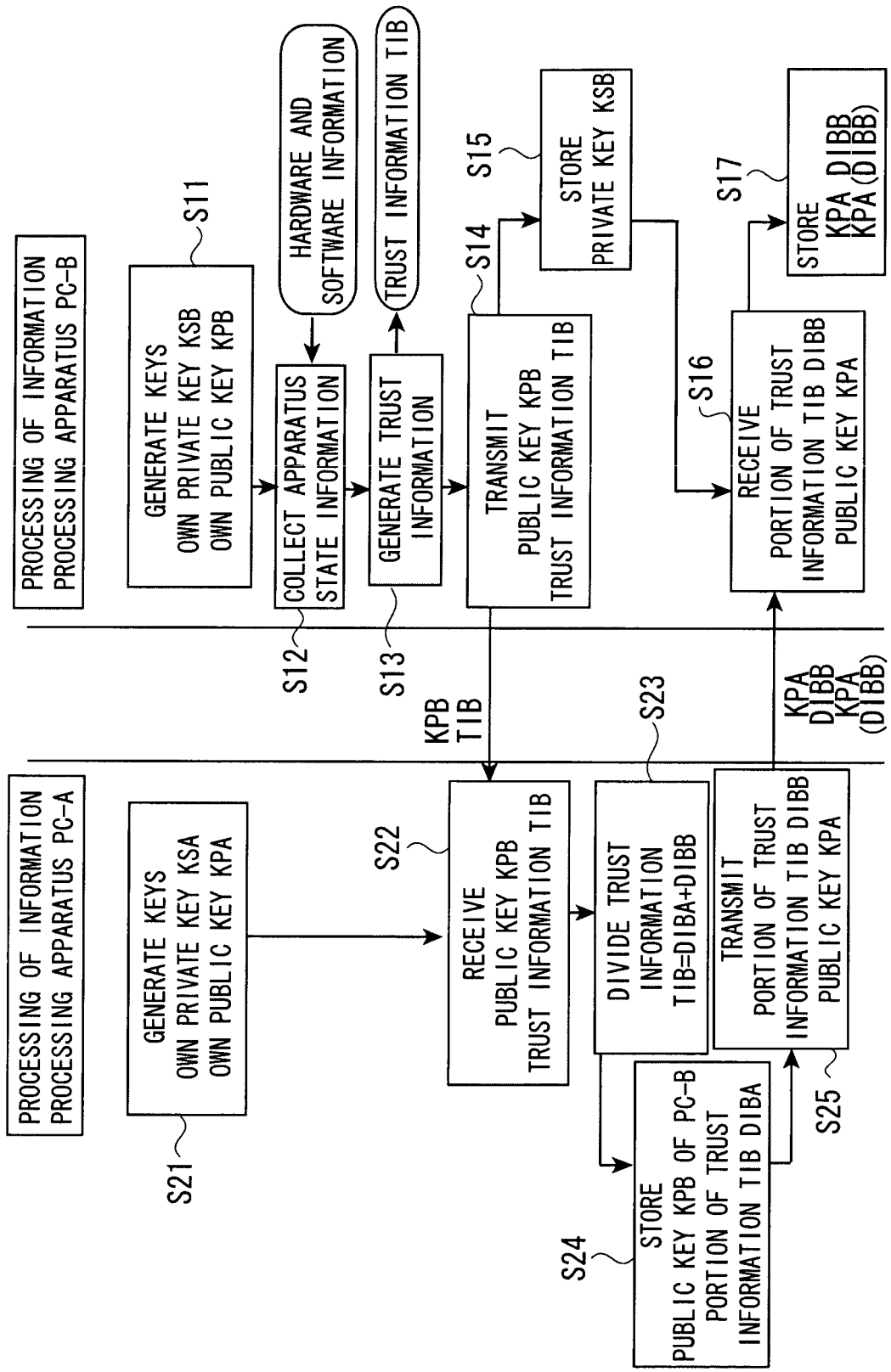
FIG. 4 is a flowchart showing a flow of the processing to exchange trust information and the like of an embodiment of the present invention.

FIG. 4 is a flowchart showing an embodiment of the exchange processing shown in FIG. 3.

First, the respective key generating units 1 in the information processing apparatuses PC-A and PC-B perform key generation processing (step S11 and step S21).

In step S11, the PC-B generates its own private key KSB and its own public key KPB.

In step S21, the PC-A generates its own private key KSA and its own public key KPA.

Next, in step S12, the apparatus state collecting unit 2 collects apparatus state information of the PC-B.

In step S13, the trust information generating unit 3 generates the trust information TIB using the collected state information.

In step S14, the communication unit 6 transmits the public key KPB and the trust information TIB of the PC-B to the PC-A.

In step S15, the private key KSB of PC-B is stored in the storage unit 11 of the PC-B.

In step S22, the PC-A receives the information (KPB, TIB) transmitted from the PC-B.

In step S23, the trust information dividing unit 4 divides the received trust information TIB.

In step S24, the received public key KPB of the PC-B and one portion of the divided trust information DIBA generated by the division are stored in the storage unit 11.

In step S25, the communication unit 6 transmits the other portion of the divided trust information DIBB and the public key KPA of the PC-A to the PC-B.

Next, in step S16, the PC-B receives the information (KPA, DIBB) transmitted from the PC-A.

As described above, on completion of step S25 and step S17, the key and the divided trust information have been stored in each of the two information processing apparatuses as shown in FIG. 2.

Since the trust information TIB generated by the PC-B is not stored in an original format but stored as the divided trust information (DIBA, DIBB) in physically different information processing apparatus (PC-A, PC-B), even if the information (the DIBA for instance) stored in one of the information processing apparatuses is stolen, the trust information TIB cannot be recovered since the thief does not have the other divided trust information (DIBB).

Further, even if a third party using another information processing apparatus PC-E listens in to the communication between the PC-A and the PC-B and illegitimately acquires the divided trust information DIBB of the PC-B, since the third party cannot, without knowing how to generate the verification information VIB using the PC-E, successfully perform the pre-transmission processing to confirm trustworthiness, so the third party cannot illegitimately acquire data from the PC-A.

In the PC-B, if the divided trust information DIBB is encrypted using the public key of the other information processing apparatus PC-A and stored as KPA (DIBB), security can be improved since only the PC-A is capable of decrypting the KPA (DIBB) with the private key KSA.

For instance, even if the third party uses the PC-E to illegitimately acquire the public key KPB and the private key KSB of the PC-B, poses as the PC-B, and acquires the encrypted divided trust information KPA (DIBB), the third party will not, without knowing the private key KSA of the PC-A, be able to recover the trust information DIBB and therefore will not ultimately be able to generate the verification information VIB corresponding to the trust information TIB.

Thus, if the third party makes a data transmission request to the PC-A using the PC-E, since the PC-E is unable to generate legitimate verification information VIB to transmit when making the request, the third party will be unable to acquire data illegitimately from the PC-A.

The exchange processing of FIG. 4 has been described as being performed between two information processing apparatuses, but may make use of an administrating apparatus (server).

Figure 5:
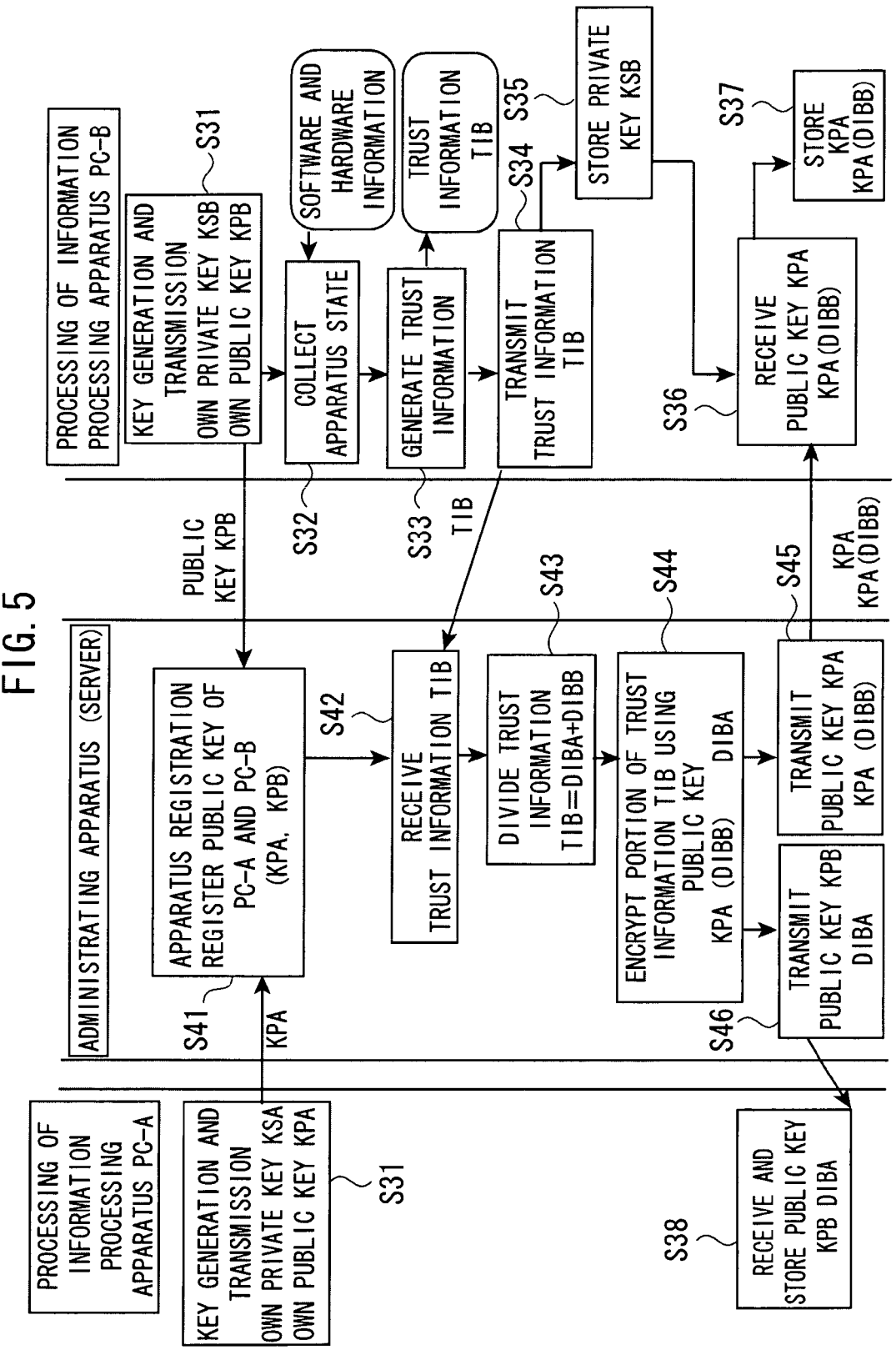
FIG. 5 is a flowchart showing a flow of the processing to exchange trust information and the like of an embodiment of the present invention.

FIG. 5 is a flowchart of an example of exchange processing which makes use of an administrating apparatus (server).

In step S31 of FIG. 5, the apparatuses (PC-A and PC-B) transmitting data to each other generate keys, and transmit the generated public keys (KPA and KPB) to the server.

In step S41, the server stores the received public keys (KPA and KPB) from the apparatuses, and registers the apparatuses PC-A and PC-B.

If PC-B is the transmission target PC, the PC-B collects apparatus state information and generates the trust information TIB in step S32 and step S33 in the same manner shown in FIG. 4.

In step S42, the server receives the trust information TIB and, in step S43, divides the trust information TIB using a predetermined dividing method to form the two portions of divided trust information (DIBA and DIBB).

In step S44, the divided trust information DIBB is encrypted using the public key KPA.

For instance, the information DIBA to be stored in the PC-A may encrypted using public key KPA of the PC-A and the information DIBB to be stored in the PC-B may be encrypted using the public key KPA of the PC-A.

In step S45, the information (KPA (DIBB)), which is the result of encrypting DIBB, and the public key KPA of the PC-A are transmitted to the PC-B.

In step S46, the DIBA and the public key KPB of the PC-B are transmitted to the PC-A.

In step S36, the PC-B receives the public key KPA and the encrypted divided trust information KPA (DIBB) from the server, and stores both in the storage unit 11 without alteration (step S37).

In step S38, the PC-A receives the public key KPB and the divided trust information DIBA from the server, and stores both in the storage unit 11 without alteration.

For security, neither the trust information TIB nor the generated divided trust information (DIBA and DIBB) are stored in the server.

In the case shown in FIG. 5, since the divided trust information transmitted to the PC-B has been encrypted using the public key of the communicating apparatus, the divided trust information cannot be recovered without the private key of the communicating apparatus.

Hence, since a third party not in possession of the private key KSA cannot recover the original DIBB by simple illegitimate acquisition of the encrypted information KPA (DIBB), the level of security can be improved.

Note also that although FIG. 4 and FIG. 5 show the case in which the data transmission of the exchange processing is performed via a network or a cable such as a LAN, the present invention is not limited to this arrangement.

Users of the PC-A and the PC-B may record necessary information on a semiconductor memory device such as a USB memory or a recording medium such as a CD or a DVD and perform the exchange processing.

For instance, the user of the transmission target PC-B may store the information (KPB and TIB), which were transmitted to the PC-A in FIG. 4, on a CD, and apply a predetermined encryption code EN to the CD to render the CD unreadable until the encryption code is inputted.

The above has described the exchange processing which has to be performed between the information processing apparatuses before data transmission.

Data Transmission Processing; First Embodiment

The following describes processing for transmitting data between the two information processing apparatuses (PC-A and PC-B).

The data transmission processing of the present embodiment is characterized by processing (from step S61 to step S66 of FIG. 7) to verify the trustworthiness of the PC-B which is the transmission target PC on the PC-A side (i.e. the transmission source side), before actual transmission of the requested data.

Figure 6:
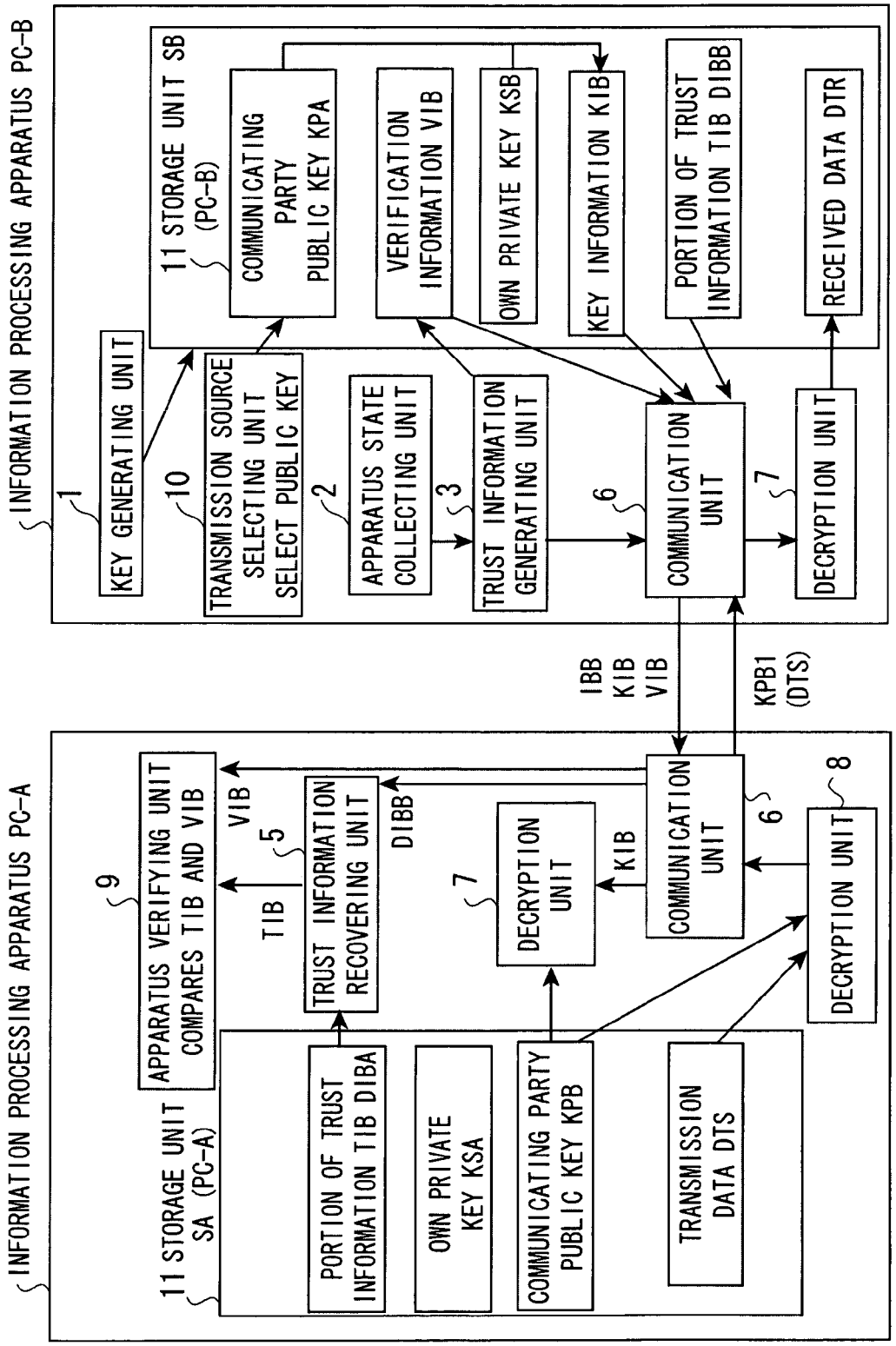
FIG. 6 is conceptual view of data transmission processing of an embodiment of the present invention.

FIG. 6 is a conceptual view of an embodiment of the data transmission processing of the present embodiment.

Of the functional blocks of FIG. 1, FIG. 6 shows only the functional blocks which are used in the data transmission processing.

Here, it is assumed that the data transmission request is transmitted from the transmission target PC-B to the transmission source PC-A, and that the PC-A confirms the trustworthiness of the PC-B using information received simultaneously with the data transmission request.

It is further assumed that the PC-B uses the transmission source selecting unit 10 to select the PC-A as the data transmission source and the data to be transmitted.

First, in order to generate information to be sent for the transmission request, the PC-B collects state information of the PC-B using the apparatus state collecting unit 2 and generates the verification information VIB of the PC-B using the trust information generating unit 3. In addition, the PC-B generates the key information KIB and encrypts the divided trust information DIBB for use when confirming trustworthiness.

The PC-B then uses the communication unit 6 to transmit the generated information set (KIB, VIB, IBB) to the PC-A.

On receipt of this information, the PC-A performs processing to decrypt the key information KIB using the decryption unit 7, processing to recover the trust information TIB using the trust information recovering unit 5, and verification processing (trustworthiness confirmation processing) to compare the recovered trust information TIB with the received verification information VIB using the apparatus verifying unit 9 in the stated order.

If the verification processing by the apparatus verifying unit 9 is successful, the transmission target PC-B is confirmed as being a trustworthy party suitable for data transmission.

Thereafter, the PC-A encrypts the requested data DTS using the encryption unit 8, and executes processing to transmit the requested data from the PC-A to the PC-B.

On receipt of the encrypted data (KPB (DTS)) in the PC-B, the decryption unit 7 performs decryption to recover the data DTS using the private key KSB of the PC-B.

In the present invention, the two portions of divided trust information (DIBA and DIBB), the key information KIB and the verification information VIB are used to perform verification processing on the transmission target information processing apparatus (PC-B) which issued the transmission request. Hence data is never transmitted to a transmission target PC which cannot be confirmed as being trustworthy.

If a third party poses as the transmission target PC using another information processing apparatus, the verification processing will fail. This arrangement therefore gives a high level of protection against data being illegitimately divulged.

Figure 7:
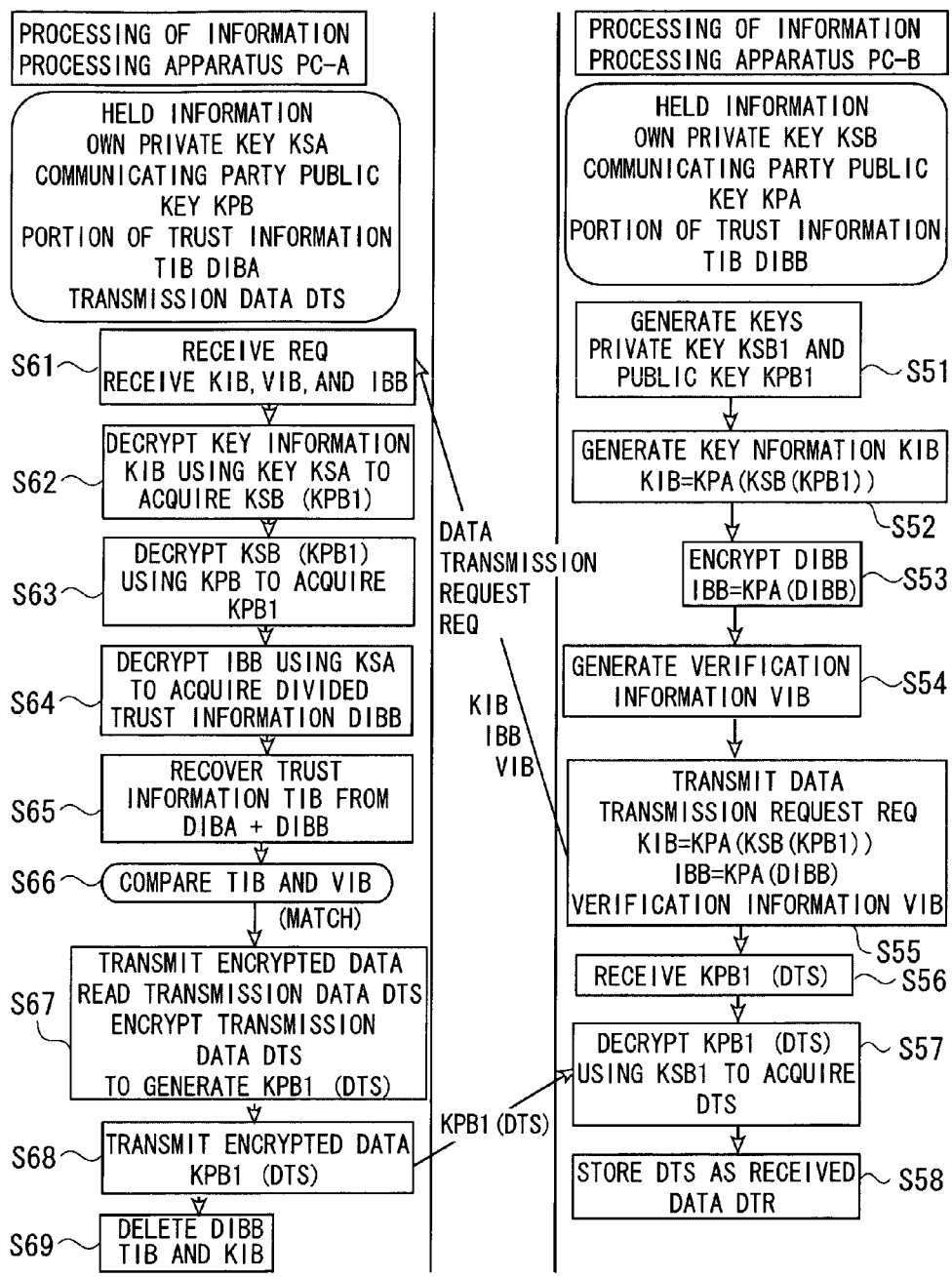
FIG. 7 is a flowchart showing a flow of the data transmission processing of an embodiment of the present invention.

FIG. 7 is a flowchart showing an embodiment of the data transmission processing of the present embodiment.

The following also describes the case in which a data transmission request is transmitted from the PC-B to the PC-A and, if the trustworthiness of the PC-A is successfully verified, the requested transmission data DTS is transmitted from the PC-A to the PC-B, as shown in FIG. 6.

It is presupposed that the exchange processing between the PC-A and the PC-B has been performed as shown in FIG. 3 and that the communicating parties have stored the held information shown in FIG. 7.

First, it is supposed that the user of PC-B has performed an input operation for acquisition of the data DTS which is held by the PC-A.

In step S51, the PC-B generates a key for encrypting the data held in PC-A.

In step S52, the PC-B generates the key information KIB.

The key information KIB corresponds to the information shown in FIG. 2. Here, however, the key information KIB is used to mean information including a key for encryption processing on the data held by the PC-A, and is denoted KPA (KSB (KPB1)).

The key information KIB is formed by encrypting the public key KPB1 of the PC-B, which is the transmission target PC whose trustworthiness is to be checked, using the private key KSB of the PC-B to form information (KSB (KPB1)) (also known as a signature), and further encrypting the information (KSB (KPB1)) using the public key KPA of the transmission source PC PC-A which is performing the check on trustworthiness.

In step S53, the PC-B encrypts the divided trust information DIBB already held by the PC-B using the public key KPA of the PC-A.

Decryption of the resulting information IBB is only possible using the private key KSA which is held exclusively by the PC-A.

In step S54, the PC-B generates the verification information VIB.

The verification information VIB is the same as or dependent on the trust information TIB, and is generated by the trust information generating unit 3 in the above-described manner using the state information collected by the apparatus state collecting unit 2.

Thereafter, the PC-B creates the data transmission request REQ including the information set (KIB, IBB, and VIB) generated by the above-described processing.

In addition to the above-described information set, the data transmission request REQ includes information to specify the desired transmission data DTS.

Note that the verification information VIB may also be encrypted using the public key KPA of the PC-A.

Thereafter, the PC-A receives the data transmission request REQ, and hence the information specifying the data DTS requested by the PC-B, and the information set (KIB, IBB, and VIB) (step S61).

In step S62 to step S66, the PC-A performs verification processing to check the trustworthiness of the transmission target PC-B, and thereafter, in step S67 and S68, transmits the requested data DTS.

In step S62, the PC-A decrypts the key information KIB using the private key KSA of the PC-A.

Next, in step S63, the PC-A decrypts the KSB (KPB1) using the public key KPB of the PC-B already held by the PC-A.

In step S62, the decryption is performed using an own private key KSA of the PC-A which is not disclosed to other PCs. Hence, the information included in the key information KIB can only be recovered by the PC-A, a party trusted by the PC-B.

If the key information KIB is transmitted to a different PC (PC-C for instance) which is not trusted by the PC-A, the public key KPB1 of the PC-B included in the key information KIB will not be correctly recovered since the PC-C does not hold the private key KSA of the PC-A.

Hence, in the PC-C not holding the private key KSA, the key decryption processing will fail.

Even if the information processing apparatus PC-B is stolen and used with malicious intention, the PC-B alone will not be able to decrypt the key information KIB or the IBB without the private key KSA held by the trusted communicating party.

Another possibility is that a third party listens in to communication between the PC-A and the PC-B using another PC-E while posing as the information processing apparatus PC-B, and transmits information which is the same as the information set (KIB, IBB, VIB) included in the data transfer request REQ shown in FIG. 7.

In this case the third party will be able to illegitimately acquire data of the PC-A, but as described below, subsequent illegitimate replay attacks by the third party can be prevented by including a different random number in each verification information VIB.

Next, in step S64, the PC-A decrypts the received information IBB using the private key KSA of the PC-A.

In step S65, the PC-A recovers the received trust information TIB.

In step S64, the PC-A generates the received trust information TIB by joining the acquired divided trust information DIBB and the already held divided trust information DIBA.

In step S66, the PC-A compares the recovered trust information TIB with the received verification information VIB.

When, for instance, both pieces of information are of the same format, the PC-A simply checks whether the two match.

When the verification fails, since the transmission target PC which transmitted the transmission request REQ may be attempting illegitimate access, the PC-A ends the processing without performing the data transmission processing.

When both pieces of information (TIB and VIB) are hash values, the PC-A checks in a similar manner whether the two match.

When the verification information VIB is a hash value and the trust information TIB is data, the PC-A calculates the hash value of the trust information TIB and checks whether the two hash values match.

When the trust information TIB is a checklist, the PC-A only checks items on checklist among the data of the verification information VIB.

When, in step S66, the trustworthiness of the PC-B has been confirmed by comparing the TIB and the VIB, the PC-A reads the data DTS indicated by the transmission request and, in step S67, encrypts the transmission data DTS.

Here the PC-A may use the public key KPB1 of the PC-B acquired from the key information KIB to encrypt the transmission data DTS.

In step S68, the PC-A transmits the encrypted data KPB1 (DTS) to the PC-B.

Alternatively, when the transmission data DTS is encrypted using the common key KCA, the PC-A transmits the common key KCA and the encrypted transmission data KCA (DTS) to the PC-B.

Note that although in this example the common key KCA is generated by the transmission source PC-A, the common key KCA can be generated using the received verification information VIB in order to limit the amount of DTS decryption in the PC-B.

In step S68, if the states of the PC-B have been updated and an update to the trust information TIB is required, new trust information TIB may be generated by the PC-A, and updated divided trust information DIBB may be included with the encrypted data (KPB1 (DTS)) as the information to be transmitted from the PC-A to the PC-B.

Next, in step S69, the PC-A deletes the received divided trust information DIBB, the received key information KIB, and the generated trust information TIB.

Thereafter, in step S56, the PC-B receives the encrypted data KPB1 (DTS).

In step S57, the PC-B uses its own private key KSB1, which is held by the PC-B alone, to decrypt the KPB1 (DTS).

In step S58, the PC-B stores the acquired data in the storage unit 11 as received data DTR.

The above-described processing completes the data transmission in response to the data transmission request REQ from the PC-B.

Note that when the common key KCA is included in the received information and the data DTS has been encrypted using the common key KCA, the received KCA (DTS) is decrypted using the received common key KCA.

Further, when the common key KCA has itself been encrypted using the public key KPB1 of PC-B, the PC-B decrypts the received KPB1 (KCA) using the private key KSB1 of the PC-B, and then uses the acquired common key KCA to decrypt the received data (KCA (DTS)).

Further, when the PC-A has generated the common key KCA using the verification information VIB, the common key KCA is not transmitted.

As described above, since the transmission source PC (PC-A) performs processing to verify the trustworthiness of the transmission target PC (PC-B) making the data transmission request before actual data transmission, it is possible to prevent important data from being illegitimately divulged to an untrustworthy transmission target.

When a third party poses as the transmission target PC (PC-B) using another information processing apparatus (PC-E), uses the PC-E to generate a correct three-piece information set (KIB, IBB, VIB), and transmits the correct information set to the transmission source PC-A, the third party may be able to illegitimately acquire the data.

A random number may be included as text data in the verification information VIB. Alternatively, a hash value of the random number may be calculated using a hash function and included in the verification information VIB as a hash value.

Then, for instance, by periodically updating the divided trust information (DIBA, DIBB) held by the two information processing apparatuses, it is possible to prevent further data divulgence if the third party makes subsequent illegitimate attempts to access data by replay attacks simply using unaltered verification information (VIB).

It is to be noted that the verification information VIB is generated in step S54 on every data transfer request. As a result, there may be occasions during the exchange processing when trust information TIB stored in the apparatuses (PC-A and PC-B) is different.

For instance, a version of software or a hardware device, which are collected as state information, may change after the PC-B has generated the trust information TIB and executed the exchange processing of FIG. 3. In such a case, there is a possibility that verification information VIB which does not match the trust information TIB will be generated.

To avoid this problem, it is preferable that unchanging information is used as the state information collected to generate the verification information.

An example, on the other hand, of information that undergoes changes is information, such as OS update condition information, and version information for virus definition files, which change as a result of software updates.

When the verification information VIB is generated to include such information, the comparison processing of step S66 may fail despite the transmission target PC-B being a trustworthy PC.

The result of the verification of step S66 may depend on the importance of the requested data.

Further, in the case that the verification processing of step S66 fails, notification of the failure may be delivered to the transmission source PC-A.

Moreover, when the risk of changes in the verification information is high due to the inclusion of the above-described changing information in the collected state information, as described below, the divided trust information stored on the PC-A side may be updated using the received verification information VIB.

Further, in the case that the verification processing of step S66 has failed once in the manner described above but the user of PC-A has given permission for data transmission, it is preferable that the stored trust information be updated.

Figure 8:
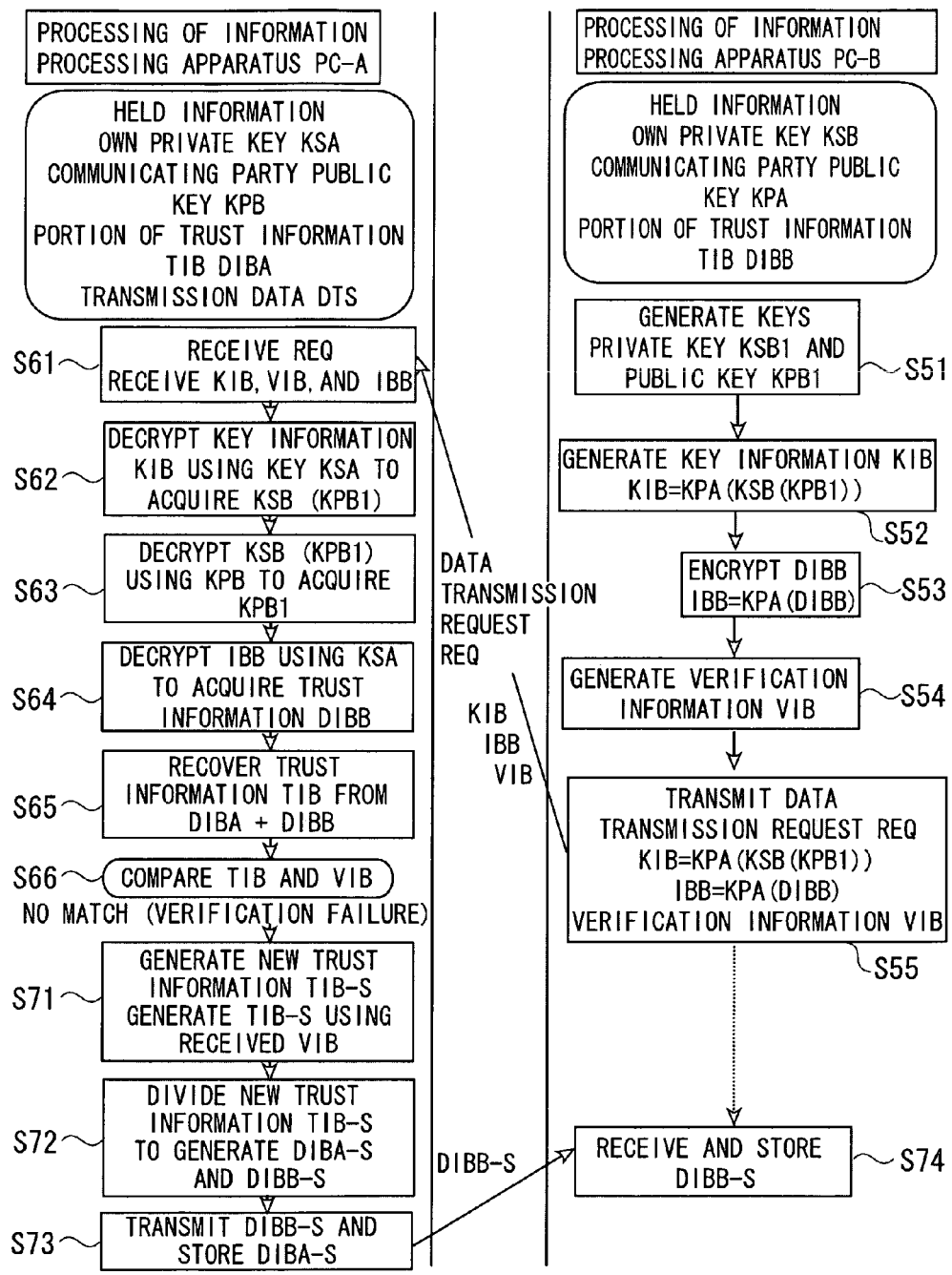
FIG. 8 is a flowchart showing a flow of trust information update processing of an embodiment of the present invention.

FIG. 8 shows a flowchart of an example of processing to update the stored information (DIBA and DIBB) of the trust information TIB.

In FIG. 8 the processing of step S51 to step S55 and of step S61 to step S66 is the same as in FIG. 7.

If, in step S66, the TIB and the VIB fail to match, the verification is considered to have failed.

If the user of the PC-A is able confirm that the mismatch of the TIB and the VIB is the result of a hardware device upgrade or OS update in the trusted PC-B, the user can determine that the reason for the mismatch is legitimate.

In such a case, the user of the PC-A uses an input operation on the PC-A to cause the processing to proceed to update processing of step S71.

In step S71, the PC-A uses the received verification information VIB to generate new trust information TIB-S.

In step S72, the PC-A divides the new trust information TIB-S.

In step S73, the PC-A transmits the new divided trust information DIBB-S to the PC-B, and stores the other new divided trust information DIBA-S in the storage unit 11 of the PC-A.

It is preferable that the PC-A encrypts the DIBB-S to be transmitted to the PC-B using public key KPA and further encrypts the result using the public key KPB of the PC-B.

In step S74, the PC-B receives the new divided trust information DIBB-S transmitted from the PC-A, decrypts the DIBB-S using the private key KSB, and stores the result in the storage unit 11.

The PC-B then uses the DIBB-S in place of the previously stored DIBB as the DIBB portion of the trust information TIB.

Updating the divided trust information stored in the two PCs in the manner described above allows verification processing to succeed after a failure to verify a trustworthy transmission target PC.

Second Embodiment

Providing a TPM (Trusted Platform Module) for the information processing apparatus makes it possible to improve security of the private key management and the like, thereby allowing more effective protection against illegitimate access at data transmission.

The TPM is a device whose content cannot be modified by a third party without physical destruction and which is capable of generating and storing a private key that is only usable by the PC equipped with the TPM.

The TPM includes therein a (PCR: Platform Configuration Register) region for storing information indicating start-up states of the hardware devices of the PC equipped with the TPM.

For instance, hash values for the software programs executed at start-up may be passed in the order of start-up from the BIOS and stored sequentially in the PCR region.

Then by reading the hash values stored in the PCR, it is possible to discover the order in which the hardware devices of the information processing apparatus PC were started.

The information (hash values) stored in the PCR can therefore be used as the verification information VIB and the trust information TIB of the PC.

In this case, the information in the PCR is first read in step S12 of the exchange processing shown in FIG. 4 and then used, in step S13, as the state information to generate the trust information TIB.

Similarly, in step S54 of FIG. 7, the information in the PCR is read and used to generate the verification information VIB.

Third Embodiment

The TPM can retain the calculated hash values in a log. The log may then be used to generate the verification information and the trust information.

Note that alteration of the PCR can be self-sensed. Encryption (signature processing) of the PCR is possible using a private key KSAIKB stored in an internal part of the TPM called an AIK and the PCR values can then be acquired by decryption using the corresponding public key KPAIKB of the AIK. This allows alterations to the log to be sensed using the PCR.

In this case, it is preferable to include the public key KPAIKB of the AIK used in the verification in the trust information TIB to improve the trustworthiness of the public key KPAIKB.

Including the public key KPAIKB in the trust information TIB reduces the risk of the public key KPAIKB being switched illegitimately in comparison to the case in which the public key KPAIKB is stored in the information processing apparatus PC-A. The trustworthiness of the verification information VIB can therefore be improved.

Fourth Embodiment

The PCR may also be used to limit use of the private key stored in the TPM.

Figure 9:
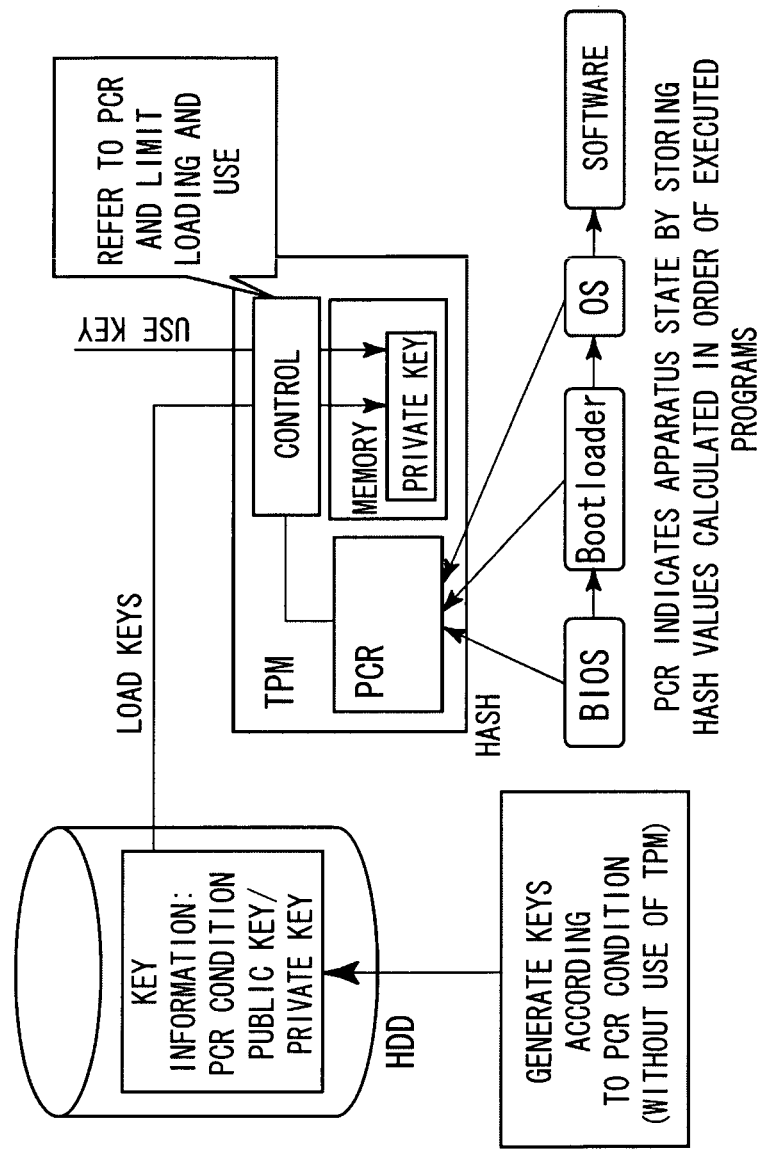
FIG. 9 is a conceptual view of TPM processing of an embodiment of the present invention.

FIG. 9 shows TPM operations which use the PCR to limit use of the private key.

First, when generating the private key and public key for encrypting the DTS in the apparatus PC-A, a "PCR condition" is set.

The "PCR condition" describes the type of values in the PCR.

To ensure that the generated private key KSA1 can only be used in the TPM of the PC-B, the PC-A encrypts the private key KSA1 of the PC-A using the public key KPB1 of the PC-B so as to allow decryption by the private key KSB1 of the TPM of the PC-B.

When loading the private key KSA1 into the TPM of the PC-B, the private key KSB1 is already loaded into the TPM.

If the "PCR condition" matches at verification in the PC-A, the private key KSA1 is loaded into the TPM, and then it is possible to decrypt KPA1 (DTS), and use DTS.

When the information processing apparatus is started up, the PCR has held measured values from the BIOS indicating a state of the apparatus.

By setting the PCR condition in this way, the use of the key for decrypting the DTS is limited. Hence, use of the private key KSA1 is restricted and it is possible to limit use of any temporarily acquired transmission data from the transmission target PC-B.

Fifth Embodiment

The embodiment shown in FIG. 6 and FIG. 7 is an example in which the transmission source PC (PC-A) first verifies the trustworthiness of the transmission target PC (PC-B) before transmitting the requested data to the PC-B.

The following describes an embodiment in which, conversely, the transmission target PC (PC-B) verifies the trustworthiness of the transmission source PC (PC-A) before storing the data received from the transmission source PC (PC-A) or the like action.

In this case, the data transmission request REQ is not transmitted from the transmission target PC-B.

Figure 10:
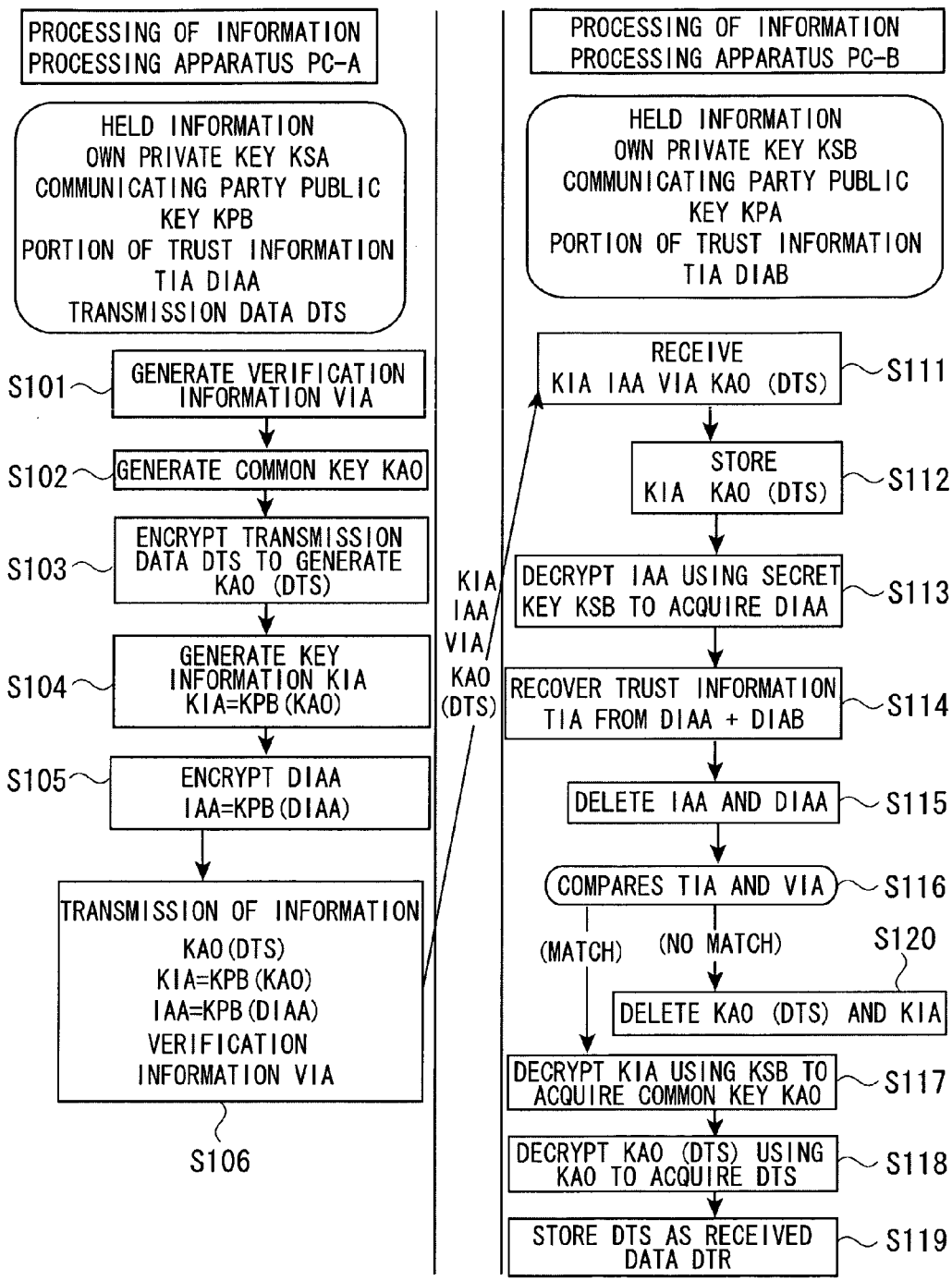
FIG. 10 is a flowchart showing a flow of the data transmission processing of an embodiment of the present invention.

FIG. 10 is a flowchart for the case in which data transmission is performed spontaneously from the transmission source.

The following describes the case in which data DTS is transmitted from the transmission source PC-A to the transmission target PC-B.

First, it is presupposed that the exchange processing of the type shown in FIG. 4 has been performed between the transmission source PC-A and the transmission target PC-B and that the two apparatuses have stored the held information shown in FIG. 10.

Since the transmission target PC-B confirms the trustworthiness of the transmission source PC-A, the generated trust information is the trust information TIA of the PC-A, and two portions of information (DIAA and DIAB), which result from the division, are stored in the PC-A and the PC-B respectively.

In step S101, the apparatus state collecting unit 2 of the transmission source PC-A collects the state information of the PC-A, and the trust information generating unit 3 generates the verification information VIA of the PC-A based the collected state information.

In step S102, the key generating unit 1 of the PC-A generates a common key KAO.

In step S103, the PC-A encrypts the transmission data DTS using the common key KAO.

In step S104, the PC-A generates the key information KIA.

In step S105, the PC-A encrypts the stored PC-A divided trust information DIAA using the public key KPB of the PC-B to generate IAA=KPB (DIAA).

In step S106, the PC-A transmits the transmission data and the generated information set to the PC-B.

Specifically, the communication unit 6 transmits the encrypted data KAO (DTS), the key information KIA=KPB (KAO), the IAA=KPB (DIAA) and the verification information VIA.

Note that the PC-A may encrypt the verification information VIA using the public key KPB of the PC-B and transmit encrypted verification information (KPB (VIA)).

In step S111, the PC-B receives the four pieces of transmitted information (KAO (DTS), the key information KIA, the IAA, and the VIA).

In step S112, the PC-B stores the received KAO (DTS) and the key information KIA in the storage unit 11.

In step S113, the PC-B uses the private key KSB of the PC-B to decrypt the IAA.

In step S114, the PC-B joins the received DIAA and the stored DIAB to recover the original trust information TIA.

In step S115, the PC-B deletes the received IAA and the generated DIAA.

In step S116, the PC-B compares the recovered trust information TIA with the received verification information VIA.

When the TIA and the VIA match, the transmission source PC-A is confirmed as being trustworthy, and the PC-B judges that it is acceptable to store the received data DTS.

Conversely, when the TIA and the VIA fail to match, the verification of the PC-A is deemed to have failed. The PC-B then judges that data cannot be received, and deletes the stored KAO (DTS) and the KIA (step S120).

When the TIA and the VIA match, the PC-B decrypts, in step S117, the key information KIA using the private key KSB of the PC-B.

In step S118, the PC-B decrypts the received KAO (DTS) using the acquired common key KAO.

In step S119, the PC-B stores the acquired data DTS as received data DTR.

Thus, as described above, the transmission target PC-B only stores received data when the trustworthiness of the transmission source PC-A has been properly confirmed.

Moreover, by not storing data from PCs whose trustworthiness cannot be confirmed, the target PC-B is able to delete data (such as viruses) which have been illegitimately transmitted with malicious intentions.

Sixth Embodiment

In a further embodiment, the processing of FIG. 7 and FIG. 10 may be combined so that the transmission source PC-A and the transmission target PC-B each verify the other's trustworthiness in consecutive transmission processing.

For instance, in step S68 of FIG. 7, the PC-A does not simply transmit the encrypted data to the PC-B. Instead, the PC-A executes step S101 to step S105 of FIG. 10 before step S68 to generate an information set (KIA, VIA, IAA) for verifying the trustworthiness of the PC-A, and transmits the generated information set together with the encrypted data.

Having the transmission source PC-A and the transmission target PC-B verify each other's trustworthiness in this manner makes it possible to improve security.

What is claimed is:

1. An apparatus that transmits data, the apparatus comprising:
   a memory to store first divided trust information which is one portion resulting from division, by a predetermined dividing method, of trust information generated by a transmission target apparatus that is a transmission target for the data, the trust information indicating a specific state of the transmission target, in advance of receiving a transmission request for the data; and
   a processor to execute a procedure, the procedure comprising:
      receiving the transmission request from the transmission target apparatus, second divided trust information which is the other portion resulting from the division of the trust information of the transmission target apparatus and verification information generated using information indicating a specific state of the transmission target apparatus,
      recovering the trust information using the first divided trust information stored in the memory and the second divided trust information that is received in the receiving,
      verifying trustworthiness of the transmission target apparatus using the trust information that is recovered in the recovering and the verification information that is received in the receiving and the trustworthiness is successful if both are matched, and
      transmitting the data indicated by the transmission request to the transmission target apparatus when the verification of the trustworthiness is successful.

2. The apparatus claimed as claim 1, wherein
the trust information is divided into the first divided trust information and the second divided trust information using a Secret Sharing Scheme.

3. The apparatus claimed as claim 1, wherein
if the recovered trust information and the received verification information are data of a same format, judging that the verification of trustworthiness of the transmission target apparatus has been successful when the trust information that is recovered in the recovering and the verification information that is received in the receiving match.

4. The apparatus claimed as claim 1, the procedure further comprising dividing the trust information into two portions of divided trust information using a predetermined division method, wherein
   when the verification of trustworthiness has failed, the received verification information, and
   the trust information is updated using the verification information, and then the updated trust information is divided into two portions, one of the two portions is stored as the first divided trust information of the storage unit, and the other of the two portions is transmitted as the second divided trust information to the transmission target apparatus.

5. The apparatus claimed as claim 1, the procedure further comprising
   storing in advance in the memory a public key of the transmission target apparatus, and encrypting the data indicated by the transmission request using the public key, wherein
   the encrypted data is transmitted to the transmission target apparatus.

6. The apparatus claimed as claim 1, the procedure further comprising
   generating a common key; and encrypting the data indicated by the transmission request using the common key, wherein
   a public key of the transmission target apparatus is stored in advance in the memory, and
   the encrypted data and the common key, encrypted using the public key of the transmission target apparatus, are transmitted to the transmission target apparatus.

7. The apparatus according to claim 1, wherein the trust information and the verification information are generated based on at least one of hardware of the transmission target apparatus and software installed on the transmission target apparatus.

8. An apparatus comprising:
   a memory; and
   a processor to execute a process, the process comprising:
      generating its own private key and its own public key;
      receiving from a transmission target apparatus that is a transmission target for data, trust information generated using information indicating a specific state of the transmission target apparatus;
      dividing the trust information into two portions of divided trust information using a predetermined division method;
      storing first divided trust information resulting from the division and the own private key; and
      transmitting the generated own public key and second divided trust information resulting from the division.

9. An apparatus comprising:
   a memory; and
   a processor to execute a process, the process comprising:
      storing in advance its own private key, a public key of a transmission source apparatus from which data is transmitted, and a portion of divided trust information resulting from division of trust information generated using information indicating its own specific state information;
      collecting current specific state information;
      generating verification information using the collected current state information;
      transmitting the generated verification information and the stored divided trust information to the transmission source apparatus when making a transmission request for data held by the transmission source apparatus; and
      decrypting the received data using the stored own private key, on receipt of transmission request data encrypted using its own public key from the transmission source apparatus.

10. The apparatus claimed as claim 9, wherein
the divided trust information stored in advance in the memory is stored in an encrypted format using the public key of the transmission source apparatus.

11. The apparatus claimed as claim 9, wherein
when making the transmission request, the divided trust information to be transmitted is encrypted using the public key of the transmission source apparatus.

12. The apparatus claimed as claim 9, wherein
when making the transmission request, transmitting key information resulting from encryption, using the public key of the transmission source apparatus, of information resulting from encryption of the own public key using the own private key.

13. The apparatus claimed as claim 9, wherein
the collected state information is data in a text or binary format or hash values.

14. The apparatus claimed as claim 9, the process further comprising
generating another private key and another public key, wherein
the trust information is generated using the collected state information, and
the another public key and the generated trust information is transmitted to the transmission source apparatus.

15. A method executed by a computer that transmits data, the method comprising:
storing first divided trust information in a memory, the first divided trust information being one portion resulting from a division, by a predetermined dividing method, of trust information generated by a transmission target apparatus that is a transmission target for the data, the trust information indicating a specific state of the transmission target apparatus;

receiving a transmission request from the transmission target apparatus, second divided trust information which is the other portion resulting from the division of the trust information generated by the transmission target apparatus, and verification information generated using information indicating the specific state of the transmission target apparatus;

recovering the trust information using the stored first divided trust information and the received second divided trust information;

verifying the trustworthiness of the transmission target apparatus using the recovered trust information and the received verification information; and transmitting the data indicated by the transmission request to the transmission target apparatus when the verification of the trustworthiness is successful.

* * * * *